(12) United States Patent
Hsiao

(10) Patent No.: US 6,918,668 B2
(45) Date of Patent: Jul. 19, 2005

(54) EYEGLASS FRAMES WITH HIDDEN MAGNETIC ATTACHMENT STRUCTURE

(76) Inventor: Yu-Teng Hsiao, No. 182, Yu Hsiao Road, Chia I (TW)

( * ) Notice: Subject to any disclaimer, the term of this patent is extended or adjusted under 35 U.S.C. 154(b) by 0 days.

(21) Appl. No.: 10/683,706

(22) Filed: Oct. 14, 2003

(65) Prior Publication Data

US 2005/0078269 A1     Apr. 14, 2005

(51) Int. Cl.⁷ ................................................. G02C 7/08
(52) U.S. Cl. ......................................... 351/57; 351/47
(58) Field of Search ................................... 351/47, 57

(56) References Cited

U.S. PATENT DOCUMENTS 5,883,688 A  *  3/1999  Chao .......................... 351/47
6,375,322 B2 *  4/2002  Takagi ......................... 351/47

* cited by examiner

*Primary Examiner*—Huy Mai
(74) *Attorney, Agent, or Firm*—Rosenberg, Klein & Lee

(57) ABSTRACT

The eyeglass frames with hidden magnetic attachment structutre include a primary eyeglass frame and an auxiliary eyeglass frame. The primary eyeglass frame is provided with a groove in the specific bottom portion, the bridge or each hinge, at least one magnetic article is provided in the groove, and a pad is provided at the bottom of the magnetic article. The auxiliary eyeglass frame is provided with a reverse U-shaped block at the specific portion, the bridge or each end, and at least one magnetic article is provided in each leg portion of the reverse U-shaped block.

5 Claims, 6 Drawing Sheets

EYEGLASS FRAMES WITH HIDDEN MAGNETIC ATTACHMENT STRUCTURE

BACKGROUND OF THE INVENTION

1. Field of the Invention

This invention relates to an eyeglass device having primary and auxiliary eyeglass frames, and more particularly to an eyeglass device, in which the auxiliary eyeglass frame is supported by and engaged with the primary eyeglass frame with hidden magnetic attachment structure, so as to have a beautiful appearance of the eyeglass frames and to prolong the service life of the magnetic articles of the magnetic attachment structure.

2. Description of the Related Art

Because a pair of eyeglasses and a pair of sun-shading glasses are independent, it is necessary for a myope or a hyperope to carry a pair of near-sighted or a far-sighted eyeglasses and a pair of sun-shading glasses on the occasion of needing to wear a pair of sunglasses. It is very inconvenient to carry and change a pair of sunglasses and a pair of eyeglasses. Thus, an auxiliary eyeglass frame being able to be coupled to a primary eyeglass frame was invented to overcome the inconvenience.

Such auxiliary eyeglass frame is detachably assembled with the primary eyeglass frame by means of various structures. Referring to FIGS. 1, 2, 3 and 4, in a conventional assembling structure, an auxiliary eyeglass frame 30 is assembled with a primary eyeglass frame 40 by magnetic articles 30a and 40a. Each magnetic articles 30a or 40a is cylindrical and inserted in the specific portion 30b or 40b of the auxiliary eyeglassframe 30 and the primary eyeglass frame 40 in vertical direction. The magnetic articles 30a and 40a can attract each other, so as to detachably combine the auxiliary eyeglassframe 30 with the primary eyeglass frame 40.

However, in the above-mentioned conventional assembling structure, the surfaces of the magnetic articles 30a or 40a are exposed outside, that is, they can be easily found at specific portions 30b or 40b of the auxiliary eyeglass frame 30 or the primary eyeglass frame 40. Additionally, the magnetic articles 30a and 40a can not be colorful to be unified in color with the auxiliary eyeglass frame 30 and the primary eyeglass frame 40, so as to lead to poor appearance of the auxiliary eyeglass frame 30 and the primary eyeglass frame 40. After being used for a period of time, the surfaces of the magnetic articles 30a and 40a are easily found to have dust, impurity or rust because they are exposed outside. Consequently, the service life of the magnetic articles 30a and 40a will be negatively affected.

SUMMARY OF THE INVENTION

Therefore, the objective of the present invention is to provide eyeglass frames with hidden magnetic attachment structure that can substantially obviate the drawbacks of the related conventional art.

An objective of the present invention is to provide eyeglass frames, in which the auxiliary eyeglass frame is supported by and engaged with the primary eyeglass frame with hidden magnetic attachment structure, so as to have a beautiful appearance of the eyeglass frames and to prolong the service life of the magnetic articles of the magnetic attachment structure.

Another objective of the present invention is to provide eyeglass frames with hidden magnetic attachment structure, in which each magnetic article in the primary eyeglass frame is slim, and the north and south poles of each magnetic article are in horizontal direction, so that the primary eyeglass frame can have more exquisite appearance, and that the magnetic articles have wider attraction area and can attract each other more firmly.

Accordingly, the eyeglass frames with hidden magnetic attachment structure in the present invention include a primary eyeglass frame and an auxiliary eyeglass frame. The primary eyeglass frame is provided with a groove in the specific bottom portion, the bridge or each temple extension, at least one magnetic article is provided in the groove, and a pad is provided at the bottom of the magnetic article. The auxiliary eyeglass frame is provided with a reverse U-shaped block at the specific portion, the bridge or each end, and at least one magnetic article is provided in each leg portion of the reverse U-shaped block.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
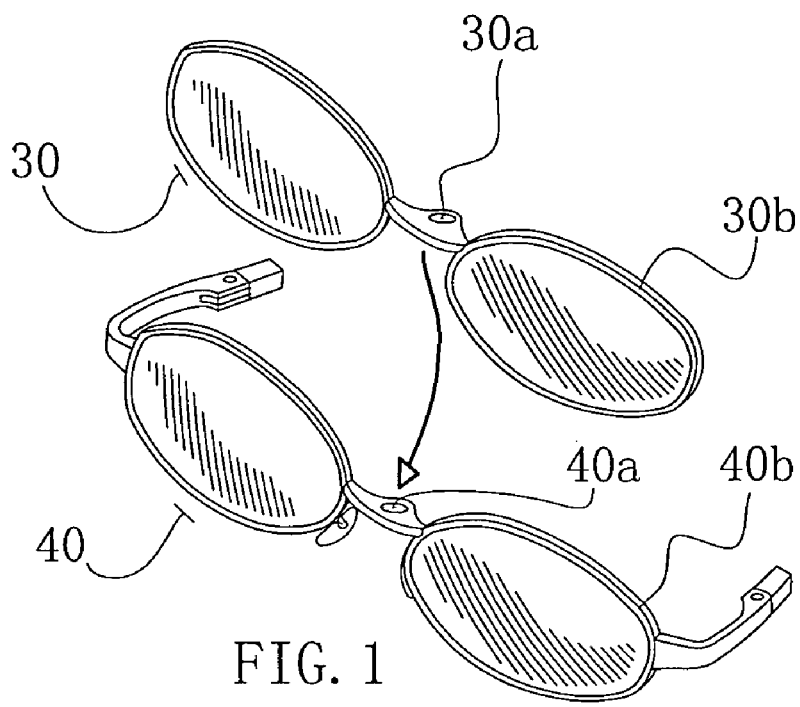
FIG. 1 is a perspective exploded view of conventional eyeglass frames with magnetic attachment structure.
Figure 2:
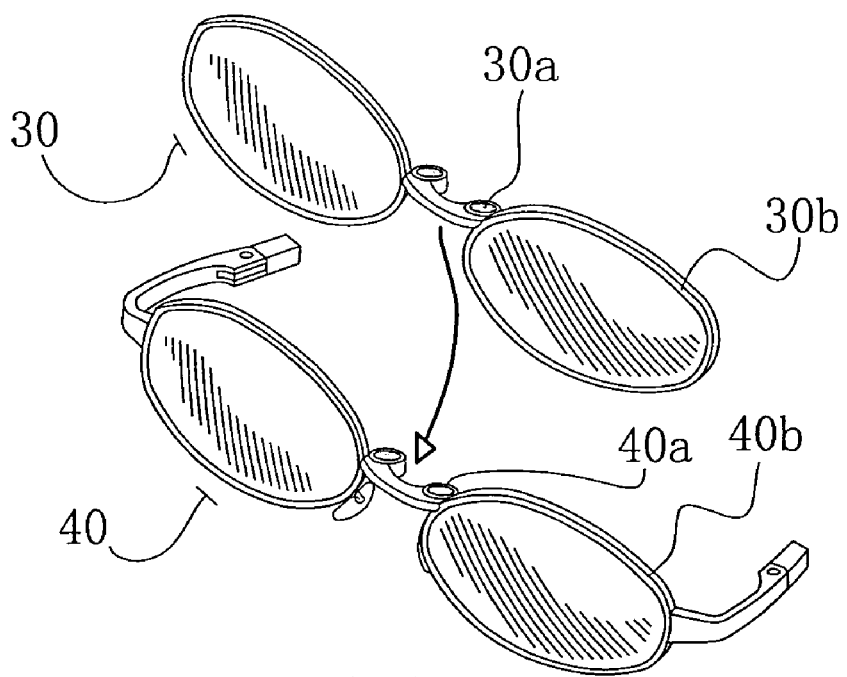
FIG. 2 is another perspective exploded view of conventional eyeglass frames with magnetic attachment structure.
Figure 3:
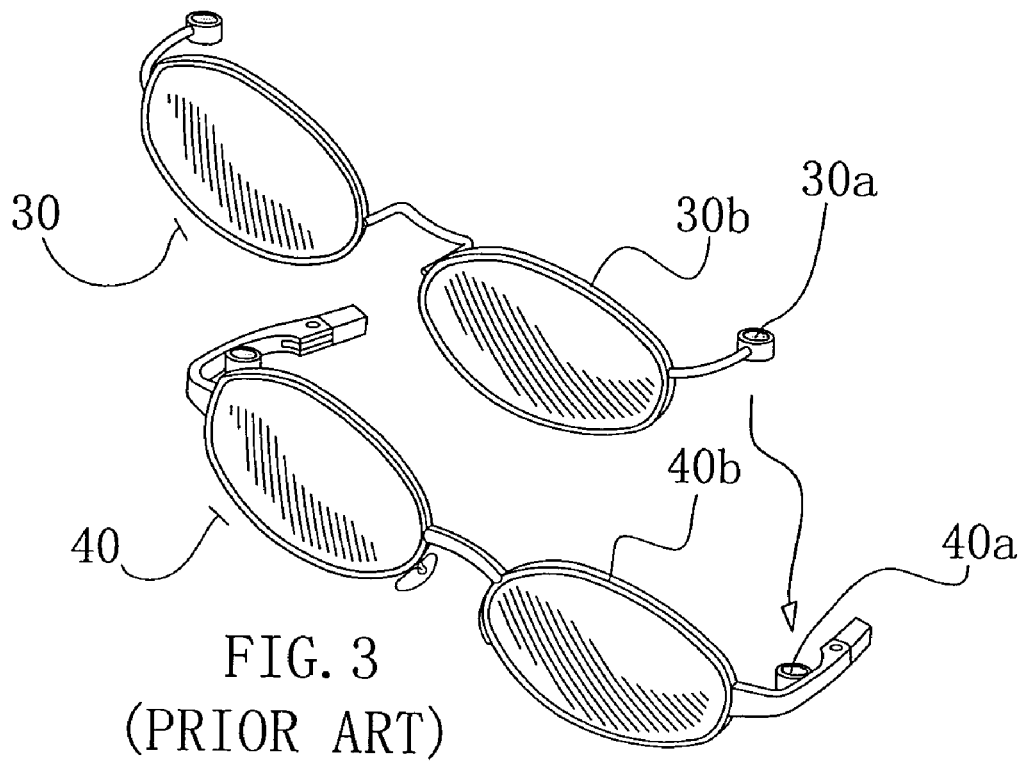
FIG. 3 is yet another perspective exploded view of conventional eyeglass frames with magnetic attachment structure.
Figure 4:
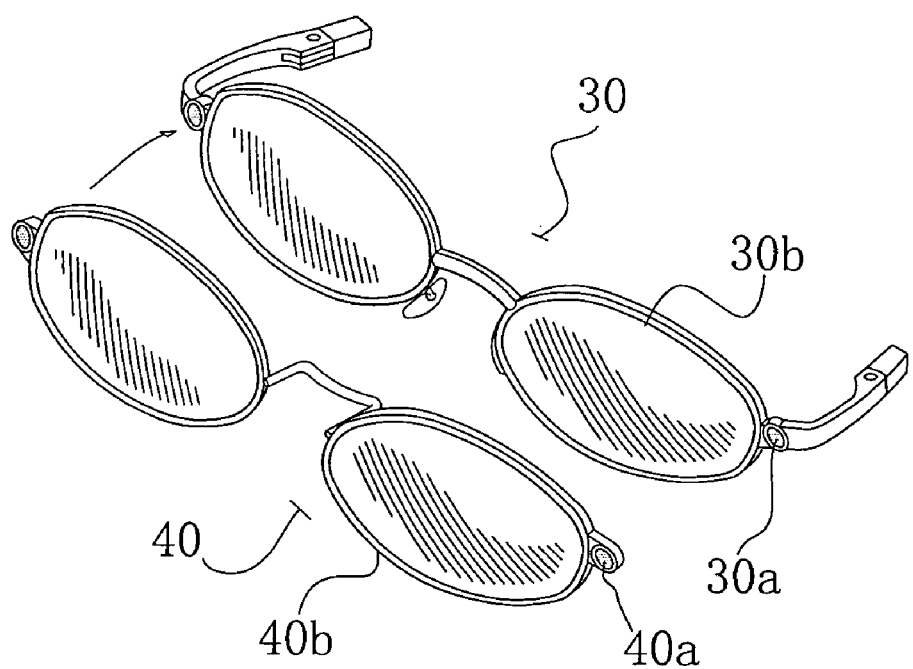
FIG. 4 is a further perspective exploded view of conventional eyeglass frames with magnetic attachment structure.
Figure 5:
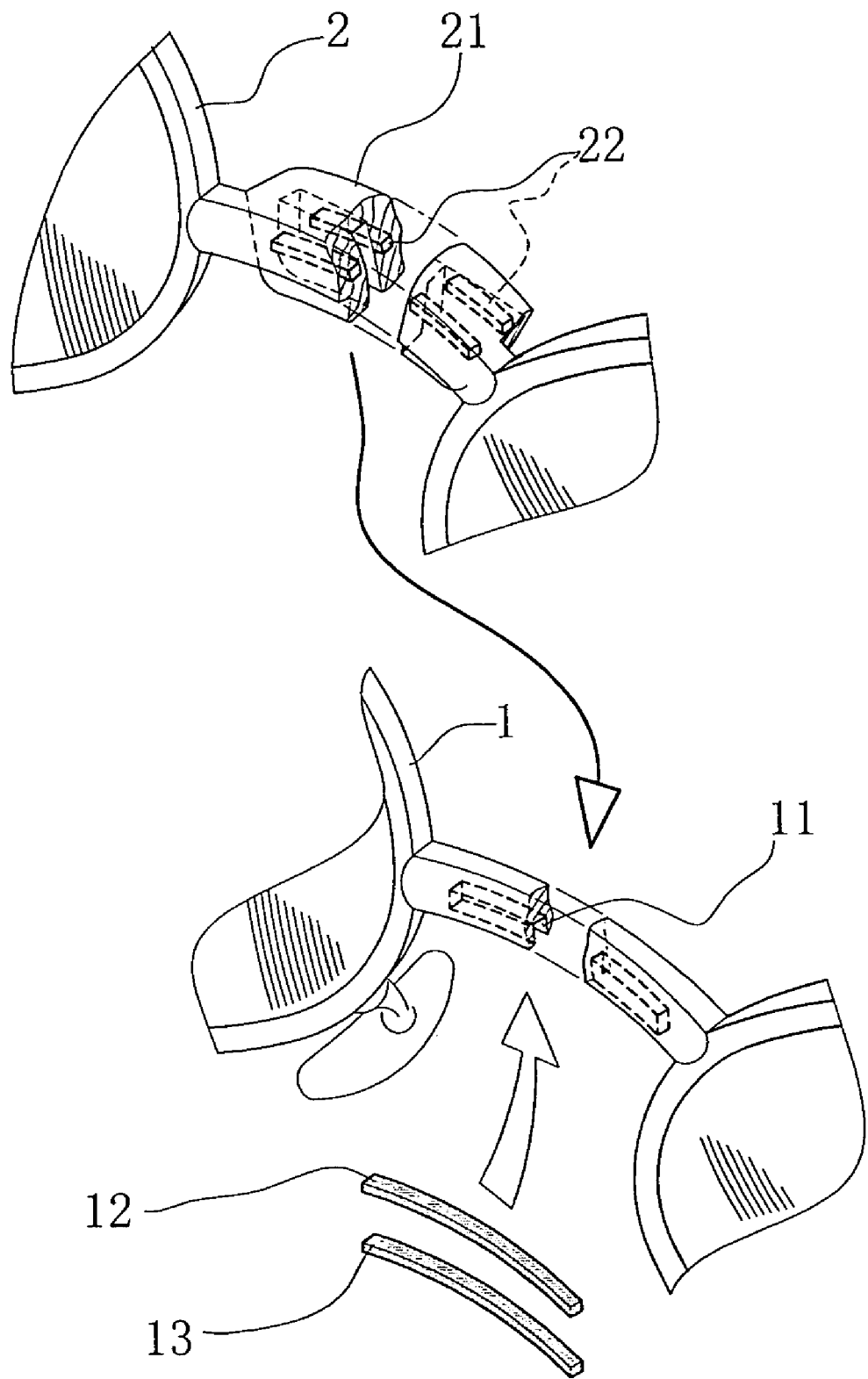
FIG. 5 is a perspective exploded view of an embodiment of the eyeglass frames with hidden magnetic attachment structure in accordance with the present invention.
Figure 9:
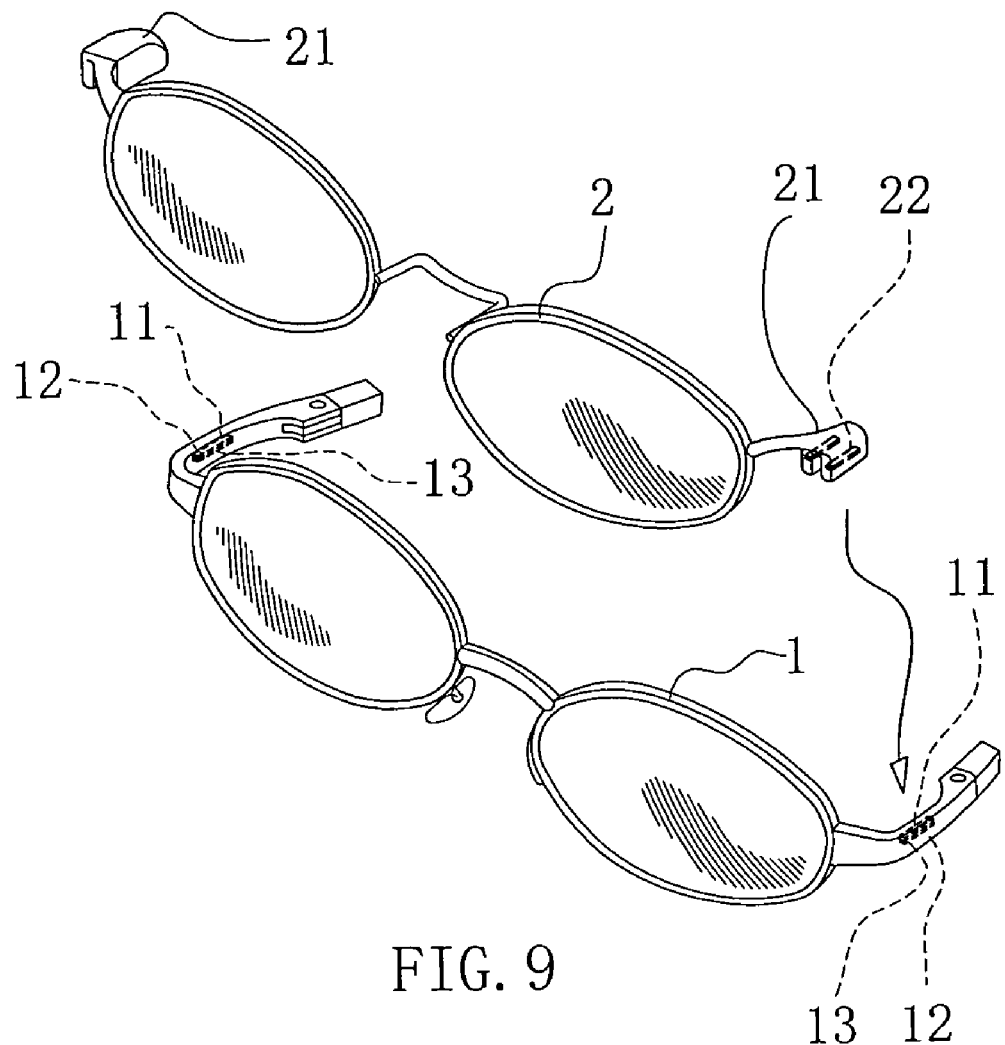
FIG. 9 is a perspective exploded view of another embodiment of the eyeglass frames with hidden magnetic attachment structure in accordance with the present invention; and, FIG. 10 is a sectional view of a part of another embodiment of the eyeglass frames of the eyeglass frames in assembled configuration in accordance with the present invention.

Referring to FIGS. 5 and 9, the eyeglass frames with hidden magnetic attachment structutre in the present invention include a primary eyeglass frame 1 and an auxiliary eyeglass frame 2.

The primary eyeglass frame 1 is provided with a groove 11 in the specific bottom portion of the bridge or each temple extension, at least one magnetic article 12 is provided in the groove 11, and the magnetic article 12 may be made of any material that can be attracted. Each magnetic article 12 has strong magnetic attraction, and its north and south poles are in a horizontal direction. A pad 13 is provided at the bottom of each magnetic article 12, and each pad 13 is made of iron.

The auxiliary eyeglass frame 2 is provided with a reverse U-shaped block 21 at the specific portion, the bridge or each end, as shown in FIG. 9. At least one magnetic article 22 is provided in each leg portion of the reverse U-shaped block 21, and the magnetic article 22 may be made of any material that can be attracted. Each magnetic article 22 has strongest magnetic attraction at the best.

Figure 6:
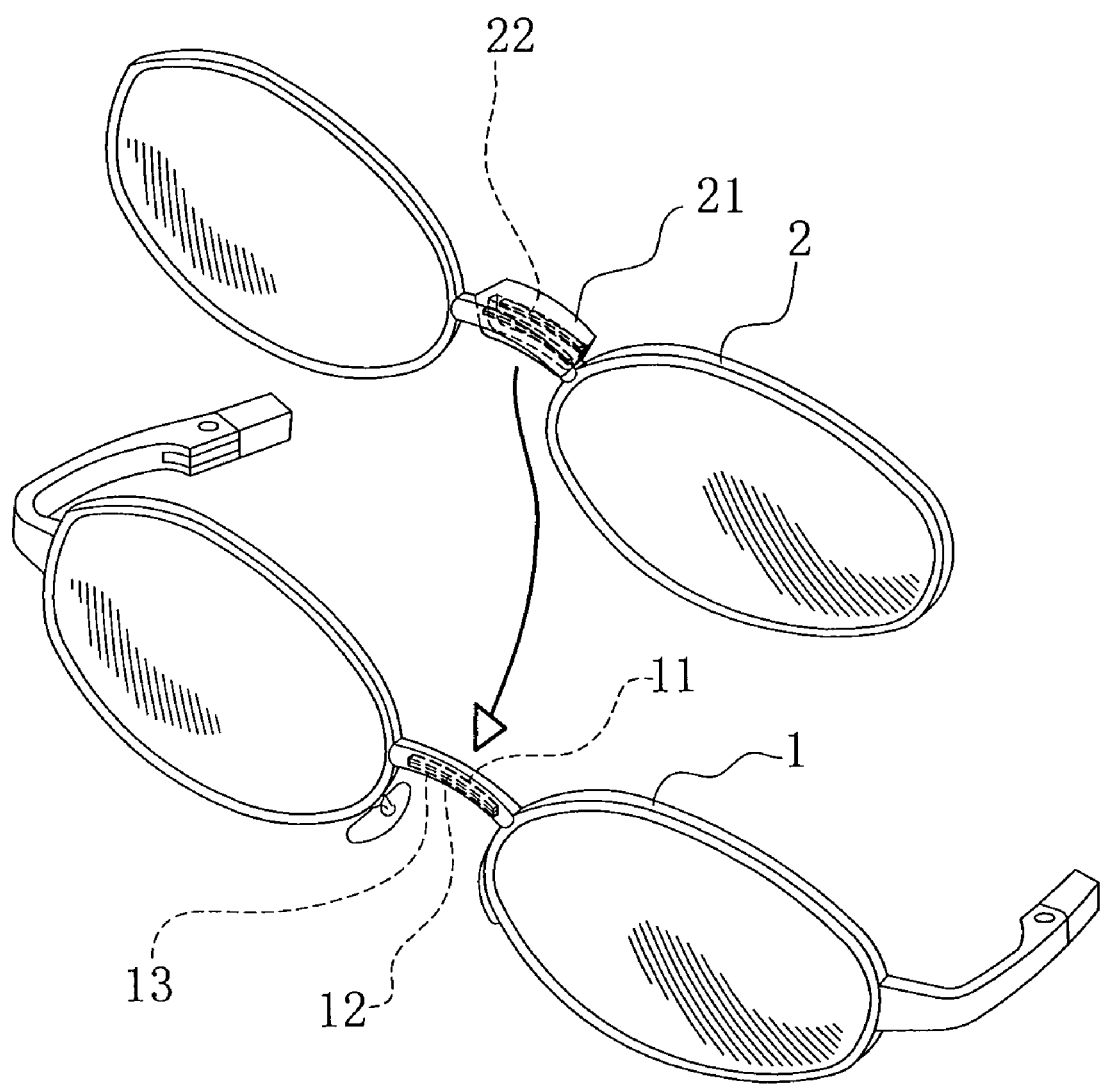
FIG. 6 is another perspective exploded view of an embodiment of the eyeglass frames with hidden magnetic attachment structure in accordance with the present invention.
Figure 7:
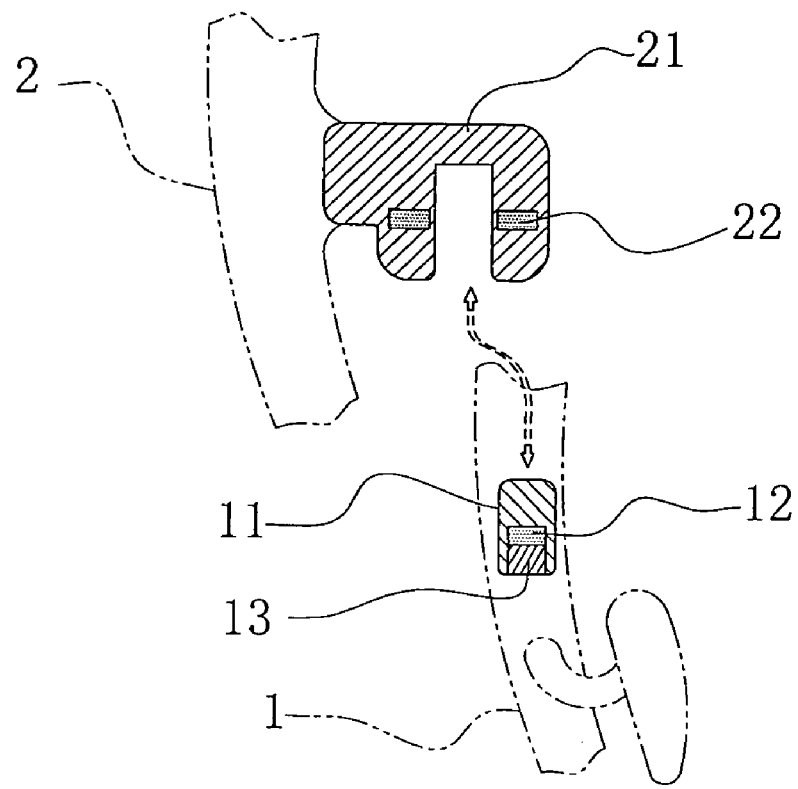
FIG. 7 is a schematic side sectional view of an embodiment of the eyeglass frames with hidden magnetic attachment structure in accordance with the present invention.
Figure 8:
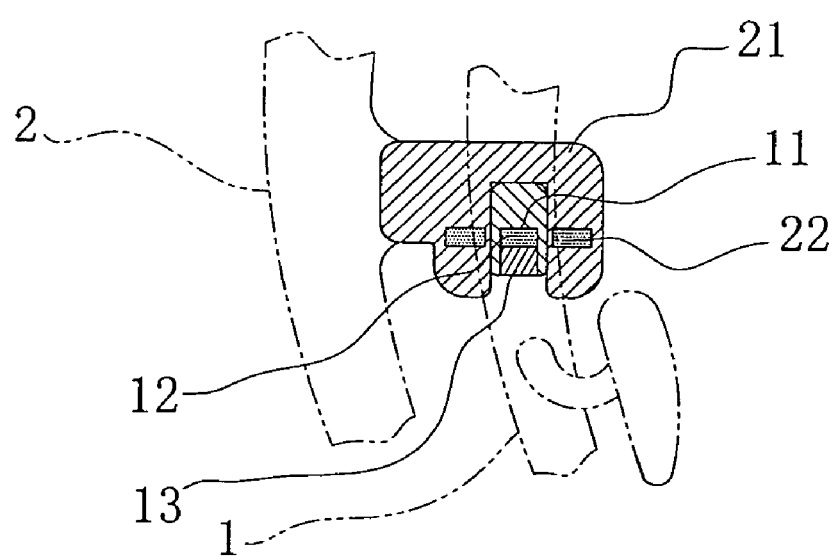
FIG. 8 is a schematic side sectional view of an embodiment of the eyeglass frames with hidden magnetic attachment structure in assembled configuration in accordance with the present invention.

While being assembled, referring to FIG. 6, the at least one magnetic article 12 is inserted in the groove 11 of the bridge of the primary eyeglass frame 1, and then the pad 13 is inserted in the groove 11 to be attracted by the magnetic article 12. Alternatively, the magnetic article 12 and the pad 13 can be inserted in the groove 11 of the bridge of the primary eyeglass frame 1 at the same time. The primary eyeglass frame 1 and the auxiliary eyeglass frame 2 are treated to have the same color, and then the auxiliary eyeglass frame 2 is secured to the primary eyeglass frame 1 with the reverse U-shaped block 21 at the bridge of the auxiliary eyeglass frame 2 directly mounting on the bridge of the primary eyeglass frame 1, so as for the magnetic article 12 in the groove 11 of the primary eyeglass frame 1 and each magnetic article 22 in each leg portion of the reverse U-shaped block 21 at the bridge of the auxiliary eyeglass frame 2 to firmly attract each other by a strongest magnetic force, refering to FIGS. 7 and 8.

Figure 10:
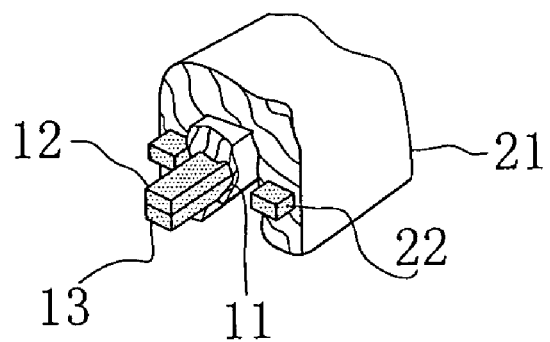

Referring to FIG. 9, a groove 11 is provided in each temple extension of the primary eyeglass frame 1, and a reverse U-shaped block 21 is provided at each end of the auxiliary eyeglass frame 2. At least one magnetic article 12 and a pad 13 are inserted in each groove 11, and at least one magnetic article 22 is provided in each leg portion of each reverse U-shaped block 21. The auxiliary eyeglass frame 2 is secured to the primary eyeglass frame 1 with each reverse U-shaped block 21 of the auxiliary eyeglass frame 2 directly mounting on each temple extension of the primary eyeglass frame 1, so as for each magnetic article 12 in each groove 11 of the primary eyeglass frame 1 and each magnetic article 22 in each leg portion of each reverse U-shaped block 21 of the auxiliary eyeglass frame 2 to firmly attract each other by a strongest magnetic force, as shown in FIG. 10.

While the preferred embodiments of the invention have been described above, it will be recognized and understood that various modifications may be made therein and the appended claims are intended to cover all such modifications which may fall within the spirit and scope of the invention.

What is claimed is:

1. Eyeglass frames with hidden magnetic attachment structure comprising:

a primary eyeglass frame being provided with a groove formed in a portion thereof selected from a location consisting of a bridge and each temple extension, at least one magnetic article being provided in each said groove, a pad being provided at the bottom of each said magnetic article; and, an auxiliary eyeglass frame being provided with a reverse U-shaped block disposed at a location corresponding to said groove of said primary eyeglass frame, said reverse U-shaped block having a pair of leg portions, at least one magnetic article being provided in each leg portion of said reverse U-shaped block.

2. The eyeglass frames with hidden magnetic attachment structure as recited in claim 1, wherein said magnetic articles in each said groove and each said leg portion of each said reverse U-shaped block are made of magnetic material.

3. The eyeglass frames with hidden magnetic attachment structure as recited in claim 1, wherein the north and south poles of each said magnetic article are in a substantially horizontal direction.

4. The eyeglass frames with hidden magnetic attachment structure as recited in claim 1, wherein each said pad is made of iron.

5. The eyeglass frames with hidden magnetic attachment structure as recited in claim 1, wherein each said magnetic article has a strong magnetic attraction.

* * * * *